United States Patent [19]
Rao et al.

[11] Patent Number: 5,598,763
[45] Date of Patent: Feb. 4, 1997

[54] FLUTTER FREE PISTON RING ASSEMBLY

[75] Inventors: V. Durga N. Rao, Bloomfield Township; David A. Yeager, Plymouth, both of Mich.

[73] Assignee: Ford Motor Company, Dearborn, Mich.

[21] Appl. No.: 213,401

[22] Filed: Mar. 14, 1994

[51] Int. Cl.$^6$ ........................................ F16J 1/04
[52] U.S. Cl. ...................... 92/212; 92/223; 277/235 A
[58] Field of Search ............... 92/212, 223; 29/888.049, 29/888.048, 888.074; 277/227, 235 A; 123/193.6

[56] References Cited

U.S. PATENT DOCUMENTS

| | | |
|---|---|---|
| 2,410,405 | 11/1946 | Cornelius . |
| 2,519,683 | 8/1950 | Marien . |
| 2,575,214 | 11/1951 | Garland et al. . |
| 2,609,260 | 9/1952 | Marien . |
| 2,817,562 | 12/1957 | Fleming et al. . |
| 3,012,831 | 12/1961 | Cheney et al. . |
| 3,095,204 | 6/1963 | Neely . |
| 3,759,148 | 9/1973 | Geffroy ........................ 92/212 |
| 3,806,139 | 4/1974 | Suzuki et al. ............... 277/235 A |
| 3,917,290 | 11/1975 | Geffroy . |
| 3,938,814 | 2/1976 | Cromwell . |
| 3,942,808 | 3/1976 | Gross . |
| 4,142,484 | 3/1979 | Buhl ............................ 123/193.6 |
| 4,612,260 | 9/1986 | Kunagai . |
| 4,735,128 | 4/1988 | Mahrus et al. . |
| 4,899,702 | 2/1990 | Sasaki et al. ................ 123/193.6 |
| 5,133,564 | 7/1992 | Chang . |
| 5,158,052 | 10/1992 | Yoshimura . |
| 5,257,603 | 11/1993 | Bauer et al. .................... 92/223 |

OTHER PUBLICATIONS

Bhushan, B. "High–Temperature Self–Lubricating Coatings and Treatments–A Review" Metal Finishing, May 1980 pp. 83–88.

*Primary Examiner*—F. Daniel Lopez
*Attorney, Agent, or Firm*—Joseph W. Malleck

[57] ABSTRACT

A piston and ring assembly operative within a cylindrical bore wall to retain fluid to one side. The piston has a side wall for movement along the cylindrical wall and has one or more spaced grooves in the side wall, each groove defining a pair of interior groove surfaces spaced apart a uniform distance; at least one sealing element presenting a pair of opposed surfaces operating between and along the pair of groove surfaces, the sealing element being capable of engaging the cylindrical wall, the spacing between the opposed surfaces of the sealing element and the pair of interior surfaces of the groove being no greater than ten microns; and a solid film lubricant mixture coating the groove surfaces and the opposed surfaces of the sealing element, whereby surface adhesion of the fluid, present in the spacing, inhibiting migration of such fluid through the spacing and flutter of the sealing element, in said spacing, being essentially eliminated.

8 Claims, 3 Drawing Sheets

FLUTTER FREE PISTON RING ASSEMBLY

BACKGROUND OF THE INVENTION

1. Technical Field

This invention relates to the design of piston and cylinder assemblies and more particularly to improvements that reduce the crevice volume of the piston cylinder assembly and enhance sealing contact of the piston rings while reducing friction.

2. Discussion of the Prior Art

This invention addresses one or more of five problems characteristic of current designs for high-temperature piston-cylinder assemblies (i.e., internal combustion engine pistons with piston rings): (i) excessive crevice volume, (ii) excessive blow-by of fluids, (iii) premature ring fatigue failure, (iv) induced oil combustion, and (v) high cost of machining ring grooves.

Crevice volume (which means the space between the piston and cylinder bore wall, including the groove spaces up to generally the point of sealing of the bottom compression ring) increases with clearance between the piston crown and bore wall, and increases with groove size. Large crevice volumes are inherent in current piston cylinder designs for commercial automotive internal combustion engines and thus allow for the presence of some unburned fuel and thereby the tendency to increase emissions. Moreover, greater fuel is injected into the combustion chamber at cold start to initiate and sustain combustion; resulting unburned fuel is not readily converted by the catalyst during cold start. Consider also that the design of the piston relative to the cylinder bore is set for the smallest clearance at cold start conditions; thermal expansion of the piston material relative to the bore material, (i.e., aluminum piston to a cast iron bore) will cause the crevice volume to increase at higher temperatures.

It would be ideal to have a piston that reciprocates within a cylinder bore with no clearance between the piston (crown or skirt) and the bore wall and with little or no friction under all operating conditions. However, to attain durability of the interfacing materials of the piston and cylinder bore wall, materials have been restricted to those which generate undesirable friction, such as iron or steel coated with nickel or chromium for the piston rings, iron or aluminum for the bore walls which sometimes is coated with wear resistant coatings, and iron or aluminum for the piston skirt which sometimes is coated with wear resistance coatings. Attaining zero clearance is even more difficult; the material selection will cause the clearance for pistons in typical cast iron cylinders, at top dead center, to vary. For example, aluminum pistons will cause the clearance to vary between 15 microns and 60 microns. The clearance can nearly double under warm operating conditions. Moreover, the bore wall may be scuffed under severe cold start conditions because liquid lubricant may not be present in the ring grooves.

Blow-by allows fluids or combustion gases to leak past piston rings to eventually foul the lubricant on the other side of the rings and create ash within the lubricant itself. Such leakage can be by migration past the backside, front-side or through the split ends of the rings. Gas leakage is usually accompanied by poor oil film scrapping allowing oil to migrate upward into the combustion chamber resulting in contamination by deposits on the combustion chamber walls. Blow-by, particularly front-side leakage, reduces engine compression and robs the engine of its designed power. Conventional ring design is set to create the smallest ring gap at high pressure/high load conditions since the high pressure behind the compression ring will force better sealing contact. But at low load, low speed conditions, gas pressure will not be there and thus the ring gap can get very sloppy. Gas pressure, which acts downwardly on the compression rings, may also freeze the ring against the bottom of the groove or against another ring, induced by high friction; this reduces the ability to maintain proper ring gap with the bore wall. The end gap between the ends of a split piston ring can also increase at high speed allowing an even greater combustion gas leakage.

Premature fatigue failure of a ring is caused by high gas pressure freezing the compression rings to their grooves while the piston slaps against the bore wall jarring and stressing the frozen ring counter to its tension while it is dragged against a non-conforming cylinder wall. Since reciprocating forces change magnitude and direction every 720° F., such stressing constitutes impact loading of the ring; impact loading leads to groove wear, ring instability (commonly referred to as flutter), and eventually ring failure by fatigue.

Induced oil consumption results from a type of peristolic pumping action of oil trapped between the oil ring and the second compression ring (the space adjacent the land between these two rings). On the upward stroke of the piston, such trapped oil is forced back up past the compression rings or behind the compression rings into the combustion chamber. Oil induced into the combustion chamber leaves a residue or carbon deposit. Induced oil consumption can be significant because oil in the land space is effectively pumped upward during the intake stroke at low speed low load engine conditions. The prior art has experimented with several two-ring designs and three-ring designs to eliminate this problem. However, all of the designs proposed to date have either increased oil consumption while reducing friction or reduced oil consumption by increasing friction with higher ring tension.

Use of iron based rings has dictated that the rings have a low height to control ring tension. Such rings require relatively narrow grooves. Thin or narrow grooves to receive such rings are much more expensive and difficult to machine on a high volume basis.

The chronological history of piston ring design for automotive applications shows repeated effort to prevent blow-by (loss of compression) noting that the rings did not seal effectively against the bore wall or noting that leakage occurred through the grooves supporting the rings. A variety of wear resistant coatings have been applied to the ring grooves as well as to the exposed circumferential sealing surface of the rings (see nickel coating in U.S. Pat. No. 2,575,214; chromium coating in U.S. Pat. No. 3,095,204; and combination coating of Ni, Co-Mo or Mo in U.S. Pat. No. 3,938,814). Flutter of the rings under reverse loading permitted gas and fluid leakage in spite of such coatings and was hoped to have been overcome by increasing the sealing contact pressure of the split rings in each of the spaced grooves. Unfortunately, such increased contact pressure increases friction which then leads to eventual groove or ring wear in spite of oil lubrication.

Applicants are unaware of any design efforts that successfully improve sealing of the piston rings without increasing piston friction.

SUMMARY OF THE INVENTION

It is an object of this invention to overcome the problems recited above and to provide an economical solution to them.

The invention is a piston ring assembly operative within a cylindrical wall to retain fluid to one side. The assembly comprises: a piston having one or more spaced grooves in the piston side wall, each groove defining a pair of interior groove surfaces spaced apart a uniform distance; at least one sealing element presenting a pair of opposed surfaces operating between and along the pair of groove surfaces, the sealing element being capable of engaging the cylindrical wall, the spacing between the opposed surfaces of the sealing element and the pair of interior surfaces of the groove being no greater than ten microns; and a solid film lubricant mixture coating the groove surfaces and at least the opposed surfaces of the sealing element, whereby surface adhesion of the fluid present in the spacing inhibiting migration of such fluid through the spacing and flutter of the sealing element in the spacing being essentially eliminated. The assembly substantially, if not totally, eliminates ring flutter while maintaining effective sealing. crevice volume is reduced, blow-by reduced, ring failure reduced and oil pumping reduced.

DETAILED DESCRIPTION IN BEST MODE

Figure 1:
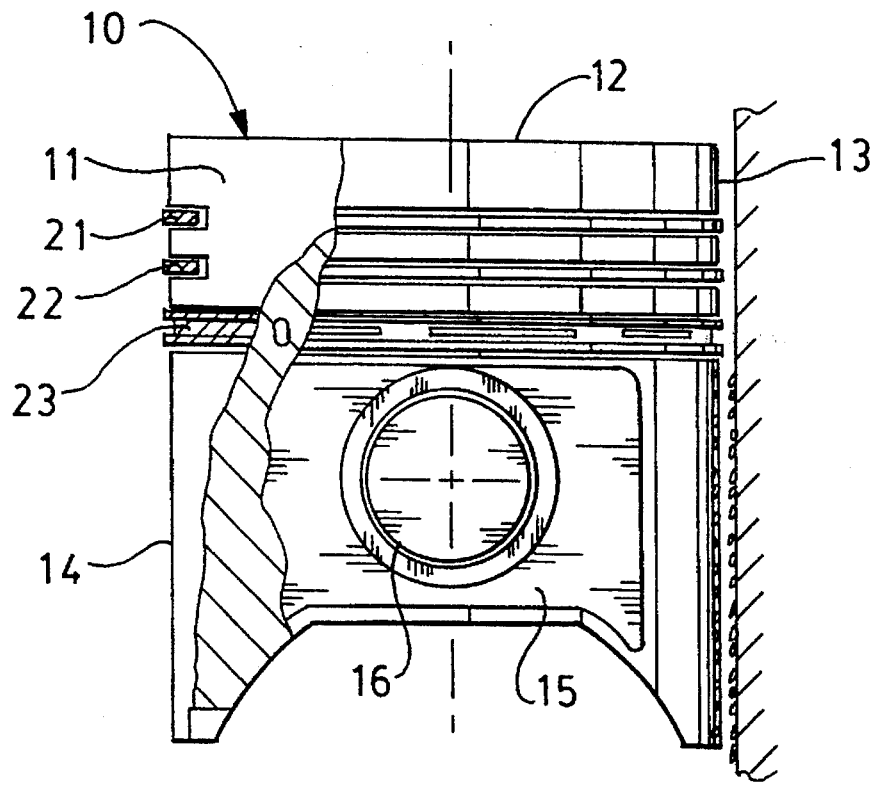
FIG. 1 is an elevational view, partially broken away, of a piston assembly embodying the principles of this invention.

The preferred piston ring assembly 10 of this invention, as shown in FIGS. 1–4, operates in a cylindrical wall 24 for movement therealong. The assembly consists of a piston 11 having a crown 12, side wall 13, skirts 14 depending from the side wall and an interior connecting structure 15 for connecting the piston to a connecting rod pin 16. The side wall has three annular grooves 17,18,19 each aligned with the plane of the piston crown, and each spaced apart an axial distance (taken with respect to the piston axis) from the other a distance 20 of about 2 to 10 mm. The top groove 17 contains a first sealing element (split compression ring 21), the second groove contains a second sealing element (split compression ring 22), and the bottom groove contains an oil control scrapper ring 23. The piston operates within the oil bathed cylinder bore wall of an internal combustion engine. The spacing 42 between the opposed groove radial surfaces, such as 43,44 for groove 17, and the opposed top and bottom surfaces of the ring, such as top surface 40 and bottom surface 41, must be ten microns or less. Each ring and each groove is coated with a solid film lubricant having a chemistry effective to reduce the coefficient of friction between the interengaging ring and grove surfaces to 0.01–0.02 in an oil bathed environment. the inherent viscosity of combustion gases, migrating from crevice space 45A into 45B, through such a narrow clearance or gap at 42, inhibits gas flow or blow-by. Moreover, the narrow clearance essentially eliminates tilting or flutter of the rings within their grooves.

The top compression ring 21 is designed to seal against fluid migration between the combustion chamber 35 and the crank case 36. The second ring 22 functions primarily as an oil scrapper during the down stroke as well as functioning as a gas seal. The oil control ring 23 scrapes oil off the bore during the down stroke as well as maintain a film in the space between the top and second compression rings during the up stroke. The oil control ring 23 is of very high tension to provide adequate sealing against gas pressure and provide effective oil scrapping. Each of the compression rings is designed to provide for a ring gap, such as at 25, with the cylinder bore wall 24 which is adequate to avoid interference under the most severe operating condition (usually the high speed/high load operation of the engine).

Figure 5:
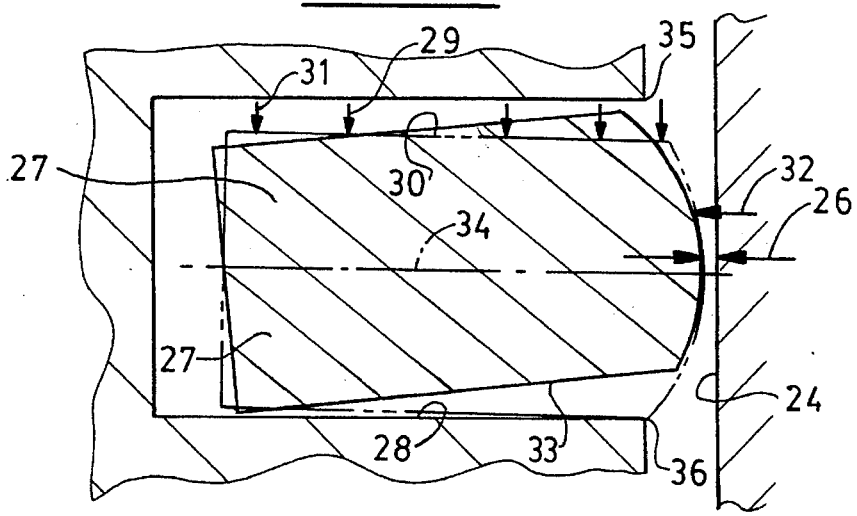
FIGS. 5 and 6 are views like FIG. 4, but depicting how prior art rings function in comparison

In prior art assemblies, the ring gap 26 (see FIG. 5) is such that it will allow a significant blow-by of combustion gases at low speed/low load conditions of the internal combustion engine. Such prior art gap 26 at low speed/low load conditions results from the ring 27 sticking to the groove side 28 or 29 during some strokes and pulling away from such groove side 28 or 29 in other strokes. The gases that blow-by contain combustion products as well as unburned charge which leads to deterioration of the oil lubricant (which is so necessary for maintaining a lubricating film on the cylinder bore and other parts of the engine). Since a major portion of the vehicle operating cycle involves low speed/low load conditions, contamination and fouling of the oil lubricant makes it necessary to change oil and oil filters at regular intervals which optimally should be eliminated.

Figure 6:
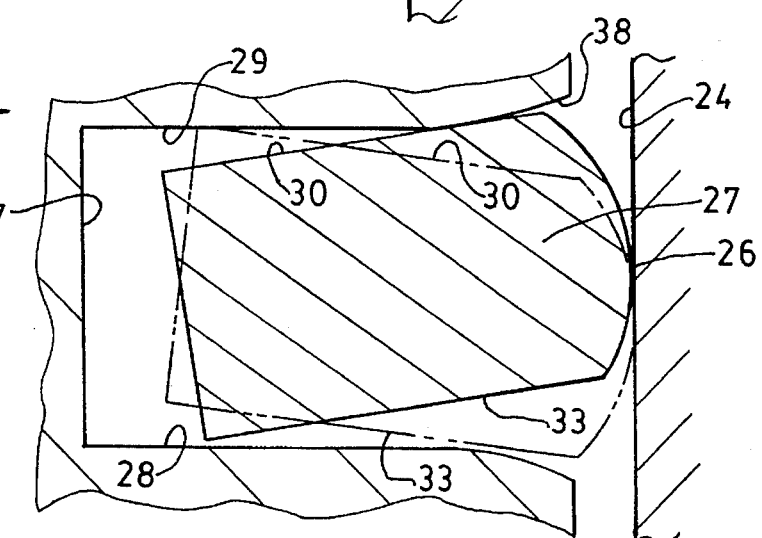

The top compression ring 21 is affected by the combustion gases acting on the top surfaces of such ring pressing the ring against the bottom surface 28 of the respective groove with a force 31 proportional to the gas pressure. Such axial force 31 is at its maximum near the top dead center (TDC) after ignition. While the high axial force 31 presses the ring down onto groove, the piston side load 32 (contact with the bore wall 24) changes from the minor thrust side to the major thrust side. Such side load 32 will stress the bottom 33 of the rings (which frictionally is joined to groove surface 28) as the piston moves from the minor thrust side to the major thrust side. Since the relative motion between the ring and groove is very slow and is oscillating, it can be assumed that the friction falls in the mixed lubrication zone and thus would have a friction range from about 12–0.15. This is a high friction coefficient since the force is cyclic and can induce fatigue failure of the metallic piston ring. For internal combustion engine operation, ring inertia forces, resulting from piston motion, gas load and friction forces between the ring and the bore, change both direction and magnitude cyclicly every 720° F. Thus, ring surfaces are subjected to cyclic impact loading leading to flutter. Flutter is the tilting of the central radial plane 34 of the ring with respect to the central radial plane of the groove. Such tilting occurs when the impact side load force 32 is greater than the produce of gas pressure force 31 times the coefficient of friction along contacting surfaces 33 and 28. flutter, being cyclic, can shorten the useful life of the ring. Flutter can cause groove wear (starting as groove edges 35,36) increasing the clearance between the ring and the groove. Often the groove wears at 38 progressively higher from the root to the tip of the groove (as shown in FIG. 6). Excessive groove wear causes not only flutter but also ring instability and fatigue. The fatigue life can be as short as 500 hours. This invention substantially eliminates flutter and groove wear by restricting any clearance between the ring and groove to ten microns or less, and by reducing the friction between the ring and groove to ultra low levels.

Damage resulting from groove wear in prior art assemblies becomes progressively worse and can lead to excessive oil consumption by virtue of peristolic pumping action.

Figure 2:
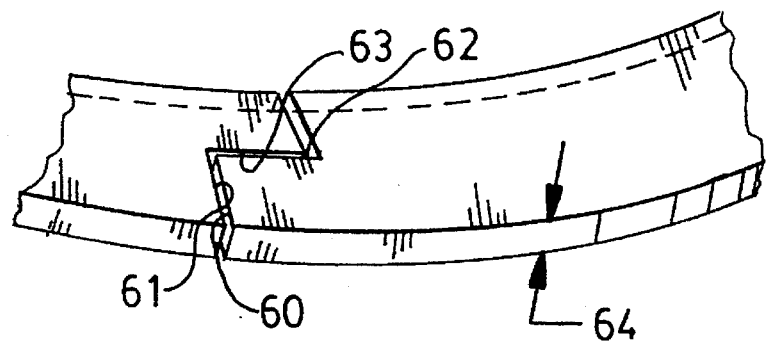
FIG. 2 is a perspective view of one of the piston rings in FIG. 1, showing the dovetail construction for the split ends of the ring.
Figure 3:
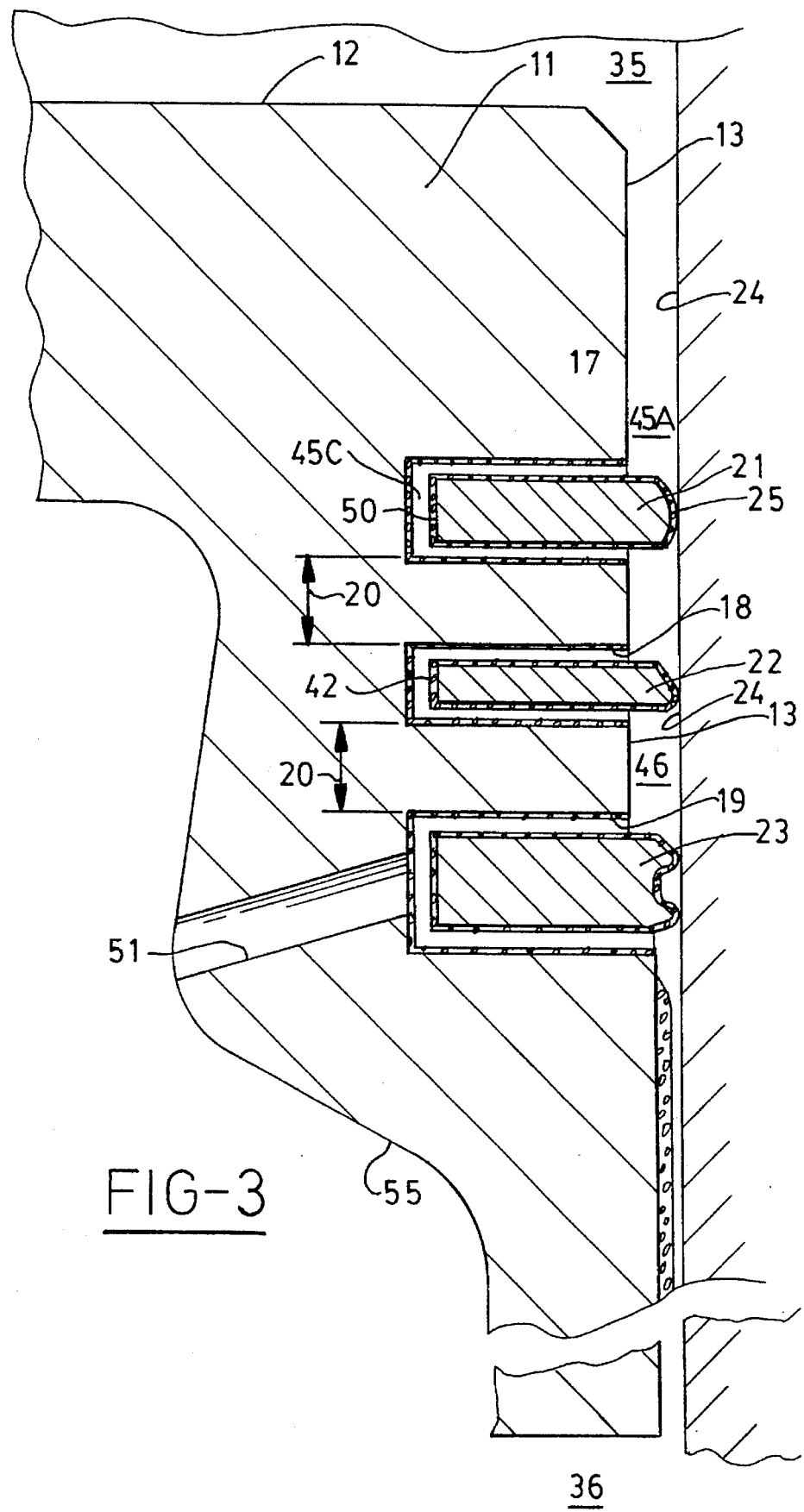
FIG. 3 is a highly enlarged sectional view of a portion of the piston and ring assembly of FIG. 1.
Figure 4:
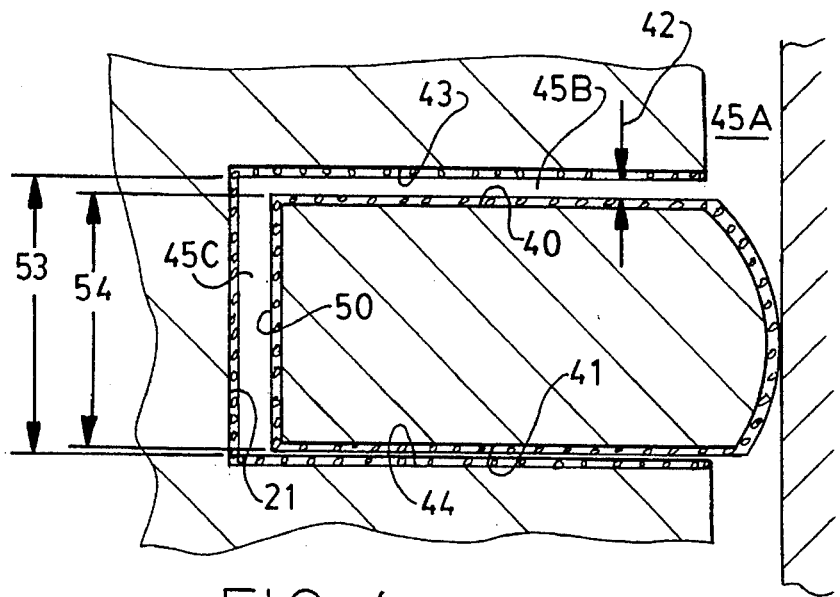
FIG. 4 is a still further enlarged view of a portion of the top groove and ring of FIG. 3.

Oil migrates into the space 46 between the piston side wall 13 and the bore wall 24 and axially between the oil scraping ring 23 and the second compression ring 22. Oil in space 46, during cyclic upward strokes, can be pushed behind the compression rings into spaces 47 and 45C and sequentially pumped into the combustion chamber. Oil consumption can increase significantly as oil is collected in this axial space 46. It can particularly occur during the intake stroke at low speed/low load engine operation. The rings may also have split ends contoured as shown in FIG. 2 to assist in preventing flow-by. Split ends 60,61 have corresponding notches 62,63 which, when the ends are brought together, create a dovetail intermesh.

In this invention, peristolic oil pumping by the piston ring has been substantially eliminated by restricting any communication for oil to migrate into spaces 46, 47, or 45C. Such restriction results from (a) the narrow clearances between the rings and the top or bottom sides of their respective grooves, and (b) the continuous engagement of the compression rings 26 or 22 with the oil film 48 on the bore wall 24. Continuous engagement is facilitated by the ultra low friction glide of such rings within the grooves enabling inherent ring tension to work in conjunction with gas pressure in spaces, such as 47, 45C, behind the compression rings 21 and 22. In addition, a drain vent 51 in the piston communication the space 46 with the piston interior and an oil sump, trapping of oil in preparation for peristolic pumping is eliminated.

During compression and expansion strokes of the piston 11, the compression ring 21 will act as an effective seal against the oil film of the bore wall 24. As the gas pressure increases during the upward movement of the piston during the compression stroke, a corresponding pressure increase occurs on the top surface 40 of the ring 21 as well as against the radially inner surface 50 of ring 21 forcing such ring with sufficient tension against the oil film of the bore wall. Good ring tension is facilitated by the ultra low friction of the rings against the groove walls. Thus, any blow-by will not occur past the inner contacting surface of the compression rings under this operation.

Compression ring 22 is usually designed to have contact force somewhat lower than that of the upper compression ring 21, because it essentially is an oil film scraper during the downward motion of the piston. Because of the rapid increase in gas pressure inside and above the compression ring 22, such rings easily engages the oil film for improved sealing and highly reduced blow-by.

The height 53 of either groove 21 or 22 is increased, over that typically used by the prior art, to at least about 4 mm which facilitates machining. The height 54 of rings 21 or 22 is increased, facilitated by constituting the rings 21 or 22 of a light weight metal, such as aluminum (i.e. Al 6061). The mass of the ring is considerably greater to give an equivalent ring tension force, thus allowing the groove to be greater in height with no weight penalty. To insure that the clearance 42 between the rings and grooves remain essentially the same, the rings should be constituted of the same metal material as the piston, such as aluminum, and the piston region around each groove should have heat extracted by a splashing cooling oil along the interior wall 55 of the piston during engine operation. The volume of cooling oil should be capable of keeping such piston regions at a temperature of 350° F. or lower.

The solid film lubricant material itself cannot rely on graphite or any one lubricant by itself, but rather upon a specific combination of solid lubricants in a special polymer that assists in replenishing graphite with water at high temperatures. The solid film lubricant comprises a mixture of at least two elements selected from the group consisting of graphite, $MoS_2$ and BN; the mixture is retained in a thermoset polymer mixture stable up to 600°–800° F. while adhering the film coating to its support and providing hydrocarbon attraction (oil attraction). The polymer is polyamide or epoxy, and should preferably constitute 45–60% by weight of the mixture.

Graphite, once selected, should be present in an amount of 29–58% weight of the mixture. Graphite is effective as a solid lubricant usually up to temperatures around 400° F. $MoS_2$, when selected, should be present in an amount of 29–58% by weight of the mixture and most importantly is effective increasing the load bearing capability of the mixture up to a temperature of at least 580° F. but will break down at temperatures in excess of 580° F. in an air or nonreducing atmosphere. $MoS_2$ reduces friction in the absence of oil or in the presence of oil and, most importantly, supports loads of at least 10 psi in such temperatures. $MoS_2$ is also an oil attractor. BN, when selected, should be present preferably in an amount of 7–16% by weight of the mixture and increases the stability of the mixture up to temperatures as high as 700° F. and concurrently stabilizes $MoS_2$. BN is an effective oil attractor. However, BN can be in amounts as high as 40%

The lubricant mixture is applied as a coating which, needs adhesion. This can be enhanced by either micro-grooving the groove walls or ring surfaces, or by employing an intermediate coating of zinc phosphate or anodized aluminum. A preferred particle size of the individual ingredients may be as follows: graphite is introduced into the mixture in the range of 0.5–4.0 microns, $MoS_2$ in the range of 0.3–4.5 microns, and BN at about 5 microns. However, larger particle sizes, up to 45 microns, can also be used particularly when post machining is desired. The mixture is typically ball milled to produce an average particle size of 0.3–10 microns. BN is capable of supporting loads of 5 psi but as part of the mixture with graphite and BN in the aforementioned polymer, loads as high as 500 psi at temperatures up to 400° F. can be supported. The optimum mixture contains all three ingredients, which provides for a temperature stability up 700° F., load bearing capacities well above 10 psi and excellent oil attraction capability. The combination of all three elements will provide a coefficient of friction which is in the range of 0.07–0.08 at room temperature and a coefficient of friction as low as 0.03 at 700° F.

Machining of the metal piston body (i.e., the side wall of the piston) can be carried out with much greater speed and accuracy because the height of the groove is much greater than that permitted by state-of-the art compression ring grooves. It is preferable to emulsion spray the solid film lubricant mixture onto the designated surfaces by first micro-grooving the metal or by subcoating zinc phosphate or anodized aluminum, and the emulsion spraying the mixture.

We claim:

1. A piston and ring assembly operative within a cylindrical bore wall to retain fluids to one side, the piston having a side wall for movement along the cylindrical wall, comprising:

(a) the piston having one or more spaced grooves in said side wall, each groove defining a pair of interior groove surfaces spaced apart a uniform distance;

(b) at least one sealing element presenting a pair of opposed surfaces operating between and along said pair of groove surfaces, said at least one sealing element being capable of engaging said cylindrical wall, the spacing between said opposed surfaces of said at least one sealing element and said pair of interior surfaces of said groove being no greater than ten microns; and (c) a continuous solid film lubricant mixture coating said groove surfaces and at least the opposed surfaces of said at least one sealing element, whereby surface adhesion of said fluid present in said spacing inhibiting migration of such fluid through said spacing and flutter of said at least one sealing element in said spacing being essentially eliminated.

2. The assembly as in claim 1 in which said at least one sealing element and piston are constituted of essentially the same light weight metal to control any differential thermal growth under varying temperature conditions.

3. The assembly as in claim 2 in which said piston has a hollow interior and the assembly comprises means for bathing said interior with oil to remove heat thereby to additionally control thermal expansion of said piston side wall and at least one sealing element.

4. The assembly as in claim 2 in which said at least one sealing element has a height of at least 2 mm.

5. The assembly as in claim 1 in which the solid lubricants in said mixture have an average particle size of 4 microns or less, whereby said spacing can be defined without post machining of said one or more grooves or of said at least one sealing element.

6. The assembly as in claim 1 in which said lubricant mixture contains a polyamide or epoxy thermoset carrier constituting 45–60% by weight of said mixture.

7. The assembly as in claim 1 in which (a) said solid lubricants in said mixture have at least two selected from the group consisting of graphite, boron-nitride and $MoS_2$, and (b) said sealing element opposed surfaces and said interior groove surfaces carrying an adherency promoting intermediate coating under said solid film lubricant, said intermediate coating being constituted of a material selected from the group of zinc phosphate, anodized aluminum, and iron phosphate.

8. A piston and ring assembly operative within a cylindrical bore wall of an internal combustion engine, the piston having a crown with an annular depending side wall for reciprocal movement along the bore wall, said bore wall being bathed in oil comprising:

(a) an aluminum based piston having a plurality of spaced grooves in said side wall, each having a rectangular cross-section with upper and lower radial surfaces spaced apart a uniform distance of at least 2 mm;

(b) one split sealing ring in each of said grooves having a cross-section complementary to its receiving groove, each ring being constituted of aluminum based metal and having a height substantially equal to said uniform distance less no more than 10 microns for clearance; and (c) a continuous solid film lubricant coating on said groove surfaces and rings, said coating being constituted of a mixture of at least two lubricants selected from the group consisting of graphite, BN and $MoS_2$.

* * * * *